(12) United States Patent
Iwase

(10) Patent No.: US 6,255,008 B1
(45) Date of Patent: Jul. 3, 2001

(54) FUEL CELL SYSTEM CAPABLE OF REDUCING ELECTRIC POWER LOSS

(75) Inventor: Masayoshi Iwase, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/353,439

(22) Filed: Jul. 14, 1999

(30) Foreign Application Priority Data

Jul. 16, 1998 (JP) .................................................. 10-219648

(51) Int. Cl.[7] ............................ H01M 8/04; H01M 16/00
(52) U.S. Cl. .................................. 429/9; 429/23; 180/65.3
(58) Field of Search .................... 429/9, 22, 23; 180/65.3

(56) References Cited

U.S. PATENT DOCUMENTS

| | | | |
|---|---|---|---|
| 5,156,928 | * 10/1992 | Takabayashi | 429/23 X |
| 5,334,463 | * 8/1994 | Tajima et al. | 429/9 |
| 5,519,312 | * 5/1996 | Wang et al. | 429/23 X |
| 5,677,073 | * 10/1997 | Kawatsu | 429/22 |
| 5,780,981 | * 7/1998 | Sonntag et al. | 429/23 X |

FOREIGN PATENT DOCUMENTS 3-276573   12/1991   (JP) .
8-213032   8/1996   (JP) .

* cited by examiner

Primary Examiner—Stephen Kalafut
(74) Attorney, Agent, or Firm—Oblon, Spivak, McClelland, Maier & Neustadt, P.C.

(57) ABSTRACT

A fuel cell system minimizes the power loss that may occur in a conduction passage during supply of electric power from a fuel cell to a load. A bypass connects between the input of a DC/DC converter and the output thereof, and therefore supplies power generated by the fuel cell to an inverter, bypassing the DC/DC converter. A changeover switch selectively changes the connection of the output of the fuel cell between the connection to the input of the DC/DC converter and the connection to the bypass. When the fuel cell is connected to the DC/DC converter, the power from the fuel cell is supplied to the inverter or a battery via the DC/DC converter. When the fuel cell is connected to the bypass, the power from the fuel cell is supplied to the inverter, bypassing the DC/DC converter. A cutoff switch disconnects the output of the battery from a connecting line. That is, the cutoff switch disconnects the battery from the inverter, the bypass and the like when turned off. When turned on, the cutoff switch 41 connects the battery to those components.

18 Claims, 5 Drawing Sheets

FUEL CELL SYSTEM CAPABLE OF REDUCING ELECTRIC POWER LOSS

INCORPORATION BY REFERENCE

The disclosure of Japanese Patent Application No. HEI 10-219648 filed on Jul. 16, 1998 including the specification, drawings and abstract is incorporated herein by reference in its entirety.

BACKGROUND OF THE INVENTION

1. Field of the Invention

The present invention relates to a fuel cell system capable of reducing electric power loss in a power conducting passage for supplying power from a fuel cell to a load.

2. Description of the Related Art

A conventional fuel cell system installable in an electric vehicle is constructed as illustrated in FIG. 5. A fuel 124, such as water and methanol and the like, is supplied into a reformer 128. The reformer 128 produces a fuel gas, such as hydrogen gas, from the fuel 124 through steam reforming reaction with methanol. The fuel gas produced by the reformer 128 and air 130 are supplied into a fuel cell 136. The fuel cell 136 generates an electromotive force through electrochemical reactions. The generated electric power is supplied from the fuel cell 136 to an inverter 144 via a DC/DC converter 138 and a diode 139. The inverter 144 also receives electric power from a battery 140 that is connected in parallel to the DC/DC converter 138. Using the power supplied thereto, the inverter 144 drives a motor 146 to provide driving force for the electric vehicle. The DC/DC converter 138 regulates the voltage output from the fuel cell 136, and applies the regulated voltage to the inverter 144 and the battery 140 in parallel.

A control unit 120 calculates a required output of the inverter 144 (i.e., required electric power) from the amount of depression of an accelerator pedal of the electric vehicle detected by an accelerator pedal position sensor 122. Based on the calculated required output, the control unit 120 controls the inverter 144 so that an electric power corresponding to the required output is supplied to the motor 146 via the inverter 144.

Normally, the fuel cell 136 outputs an amount of power that provides the required output of the inverter 144. However, if the power from the fuel cell 136 alone is not sufficient for the required output of the inverter 144, the control unit 120 sets the output voltage of the battery 140 to a desired value such that a supplement power for the required output is outputted (discharged) from the battery 140 to the inverter 144, by controlling the DC/DC converter 138 to adjust the output voltage of the DC/DC converter 138 in accordance with a state of charge (SOC) of the battery 140 detected by an SOC sensor 142.

If the power from the fuel cell 136 has a surplus after providing the required output of the inverter 144, the control unit 120 controls the DC/DC converter 138 to set the output voltage of the battery 140 to a desired value such that the surplus power is stored (charged) into the battery 140.

That is, the related-art fuel cell system adjusts the output voltage of the DC/DC converter 138 provided between the fuel cell 136 and the parallel circuit of the battery 140 and the inverter 144, so as to set the output voltage of the battery 140 to various desired values, whereby a desired amount of power is outputted (discharged) from or stored (charged) into the battery 140.

Therefore, power from the fuel cell 136 is supplied to the inverter 144, always via the DC/DC converter 138.

However, the power converting efficiency of the DC/DC converter 138 is normally as low as 70–80%. Since power from the fuel cell 136 is supplied via the DC/DC converter 138, the related-art fuel cell system has a problem of a considerable power loss caused by the DC/DC converter 138.

SUMMARY OF THE INVENTION

Accordingly, it is an object of the present invention to provide a fuel cell system capable of minimizing the power loss that occurs in a power conducting passage during supply of power from a fuel cell to a load.

To achieve at least a portion of the aforementioned and other objects of the invention, the fuel cell system of the invention includes a fuel cell that is supplied with a fuel and generates a power, a secondary battery capable of storing the power generated by the fuel cell and of supplying a power stored therein to a load, a voltage adjusting device for adjusting a voltage generated by the fuel cell, a bypass device for supplying the power generated by the fuel cell to the load, bypassing the voltage adjusting device, and a switch device for selectively changing the path for the supply of the power generated by the fuel cell to the load between a path via the voltage adjusting device and a path via the bypass device.

In the invention, if the switch device is switched so that the power generated by the fuel cell is supplied to the load via the bypass device, the power supply from the fuel cell to the load bypasses the voltage adjusting device, so that substantially no power loss occurs in the conduction passage.

In a case where it is unnecessary to store power into the secondary battery or output power from the secondary battery, the electric connection between the secondary battery and the bypass device and the electric connection between the secondary battery and the load may be discontinued by using a shutting device in such a manner that the secondary battery is completely electrically disconnected from the load, the fuel cell and the like. The electrical disconnection of the secondary battery in this manner does not cause any substantial problem. When the secondary battery is thus disconnected, it becomes unnecessary to set the output voltage of the second battery to a desired value, so that the voltage adjusting device becomes unnecessary in this case. Therefore, the power generated by the fuel cell can be supplied to the load via the bypass device by using the switch device, without causing any problem. Hence, substantially no power loss occurs in the conduction passage.

The aforementioned case where it is unnecessary to store power into the secondary battery or output power from the secondary battery may include a case where an amount of charge of the secondary battery is substantially 100% and a case where a difference between a required power of the load and an expected output power of the fuel cell is substantially zero and where the amount of charge of the secondary battery is greater than a predetermined reference amount.

In the case where the amount of charge of the secondary battery is substantially 100%, no more power can be stored into the secondary battery. Therefore, this case can be regarded as a case where storage of power into the secondary battery is unnecessary. In the case where the difference between the required power of the load and the expected output power of the fuel cell is substantially zero, there is no need to supply power from the secondary battery to the load. In the case where the amount of charge of the secondary battery is greater than the predetermined reference amount, there is not a considerable need to store power into the secondary battery. Therefore, these cases can be regarded as a case where it is unnecessary to output power from the secondary battery or store power into the secondary battery.

In the fuel cell system of the invention, the voltage adjusting device may be formed by a DC/DC converter that is suitable to adjust, that is, increase or decrease, the voltage outputted from the fuel cell, to a desired value.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
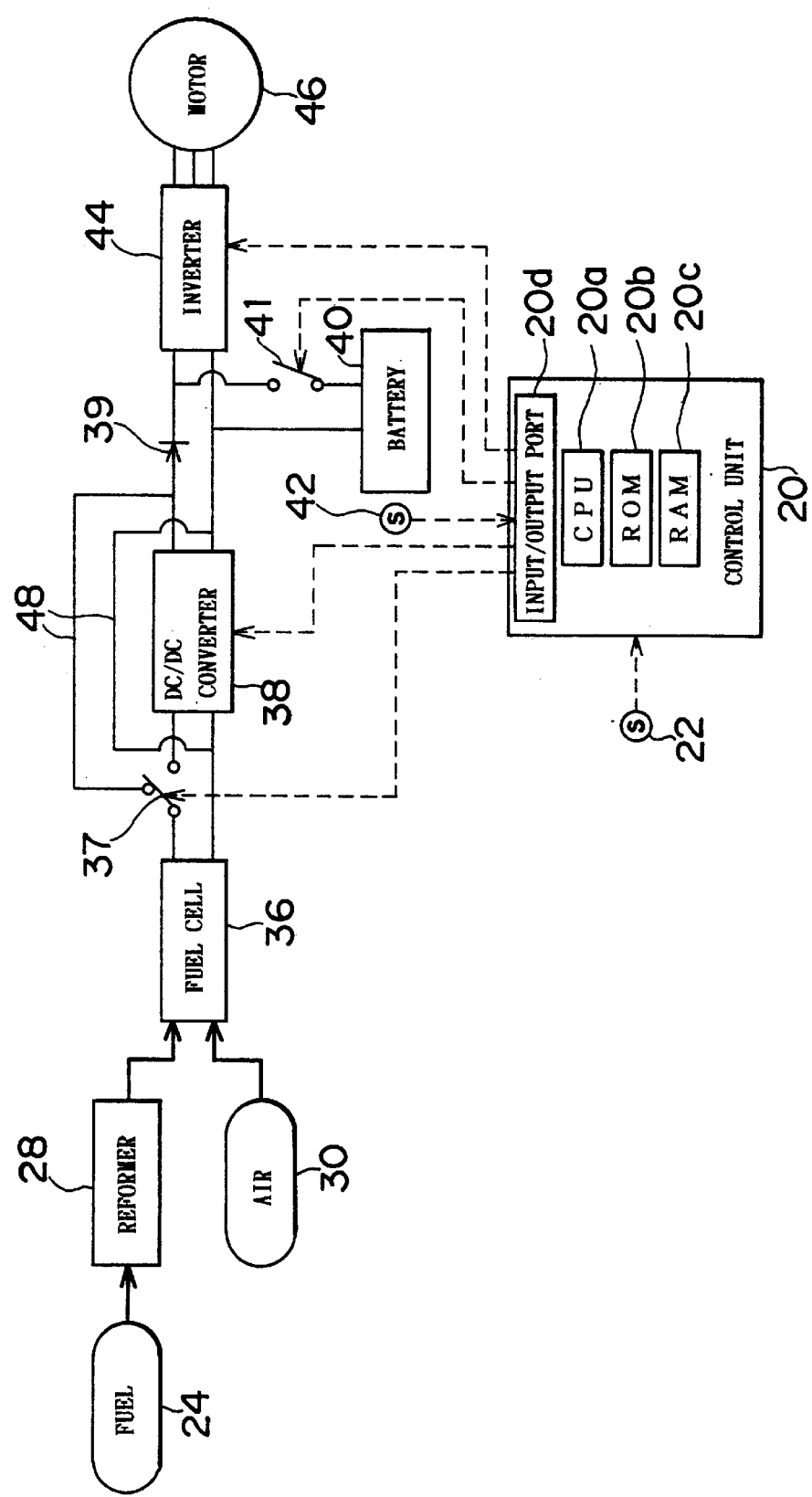
FIG. 1 is an illustration of the construction of a fuel cell system according to an embodiment of the invention.

A preferred embodiment of the present invention will be described in detail hereinafter with reference to the accompanying drawings. FIG. 1 is an illustration of the construction of a fuel cell system according to an embodiment of the invention. The fuel cell system of the embodiment may be installed in an electric vehicle.

The construction of the fuel cell system illustrated in FIG. 1 and overall operation thereof will be described. The fuel cell system shown in FIG. 1 has, as main components, a control unit 20, an accelerator pedal position sensor 22, a reformer 28, a fuel cell 36, a changeover switch 37, a DC/DC converter 38, a diode 39, a battery 40, a cutoff switch 41, a state-of-charge (SOC) sensor 42, an inverter 44, a motor 46, and a bypass 48.

The reformer 28 is supplied with a fuel 24, such as methanol and water and the like, and produces a hydrogen-rich gas (reformed gas) containing hydrogen through a steam reforming reaction with methanol as expressed by equation (1):

$$CH_3OH + H_2O \rightarrow 3H_2 + CO_2 \quad (1)$$

The fuel cell 36 receives the hydrogen-rich gas produced by the reformer 28 as a fuel gas and also air 30 as an oxygen-containing oxidative gas, and causes electrochemical reactions as expressed by equations (2)–(4) to generate electric power.

$$H_2 \rightarrow 2H^+ + 2e^- \quad (2)$$

$$2H^+ + 2e^- + \tfrac{1}{2}O_2 \rightarrow H_2O \quad (3)$$

$$H_2 + \tfrac{1}{2}O_2 \rightarrow H_2O \quad (4)$$

In this embodiment, the fuel cell 36 is formed by a polymer electrolyte fuel cell having a stack structure formed by stacking a plurality of unit cells (not shown), each of which is made up of an electrolyte film, an anode, a cathode, a separator and the like. The hydrogen-rich gas introduced into the fuel cell 36 is supplied to the anode of each unit cell via a fuel gas passage (not shown), so that the hydrogen-rich gas is consumed by the reaction expressed by equation (2). Air is supplied to the cathode of each unit cell via an oxidative gas passage, so that it is consumed by the reaction expressed by equation (3). Equation (4) expresses the reaction that occurs in the entire fuel cell.

The fuel cell 36 is connected, via the DC/DC converter 38, to the battery 40 and the inverter 44, which are connected in parallel. Power generated by the fel cel 36 is supplied via the DC/DC converter 38 to the inverter 44 and, in some cases, to the battery 40.

The DC/DC converter 38 increases or decreases the voltage from the fuel cell 36, and applies the adjusted voltage to the inverter 44 and the battery 40 in parallel, via the diode 39. The DC/DC converter 38 adjusts the value of the output voltage (regulates the voltage) in accordance with a control signal from the control unit 20. The electric passage from the fuel cell 36 to the load 46 via the DC/DC converter 38 is a first electric passage.

The diode 39 allows current to flow only in the direction from the DC/DC converter 38 to the inverter 44 and the battery 40.

The battery 40 stores power supplied from the fuel cell 36 and, in some cases, stores power regenerated by the motor 46 and supplied via the inverter 44. The battery 40 also supplies power to the inverter 44. In this embodiment, the battery 40 is a secondary battery such as a lead storage battery or the like. The battery 40 may also be other type of secondary battery such as a nickel-cadmium storage battery, a nickel-hydrogen storage battery, a lithium secondary battery, and the like. The source capacity of the battery 40 is determined depending on the expected running condition of the electric vehicle, that is, the expected magnitude of load, the source capacity of the fuel cell 36 provided in the vehicle, and the like.

The SOC sensor 42 detects the state of charge (SOC) of the battery 40, and sends the result of detection to the control unit 20. More specifically, the SOC sensor 42 is formed by an SOC meter that integrates the value of discharge or charge current with time. Based on the integrated value, the control unit 20 calculates the amount or state of charge of the battery 40. Instead of the SOC meter, a voltage sensor for measuring output voltage of the battery 40 or a specific gravity sensor for measuring the specific gravity of the electrolyte in the battery 40 may be used as the SOC sensor 42. In this case, the control unit 20 uses the value measured by the sensor to determine the amount or state of charge of the battery 40.

The inverter 44 drives the motor 46 by using the power supplied from the fuel cell 36 and/or the battery 40. More specifically, the inverter 44 converts the DC voltage supplied from the DC/DC converter 38 or the battery 40 into three-phase AC voltage and supplies the three-phase AC voltage to the motor 46. In accordance with the control signal from the control unit 20, the inverter 44 adjusts the frequency and the amplitude of the three-phase AC voltage (pulse width in reality) to be supplied to the motor 46, so as to control the torque produced by the motor 46.

In reality, the inverter 44 is formed mainly by six switching elements (for example, bipolar MOSFETs (IGBTs)). The switching operation of the switching elements is controlled by the control signal from the control unit 20 so that the DC voltage applied to the inverter 44 is converted into three-phase AC voltage having a desired amplitude and a desired frequency.

The motor 46 is formed by, for example, a three-phase synchronous motor. The motor 46 is driven by power supplied from the fuel cell 36 and/or the battery 40 via the inverter 44, so that a torque on the drive shaft (not shown) is generated. The generated torque is transmitted to the axle (not shown) of the electric vehicle via gears (not shown), thereby providing the axle with rotational drive force. The electric vehicle is therefore provided with the drive force, and the vehicle is thus driven.

The accelerator pedal position sensor 22 detects the amount of depression of the accelerator pedal of the electric vehicle and sends the result of detection to the control unit 20.

The control unit 20 has a CPU 20*a*, a ROM 20*b*, a RAM 20*c*, and an input/output port 20*d*. The CPU 20*a* executes desired operations in accordance with the control programs to perform various operations and controls. Pre-stored in the ROM 20*b* are the aforementioned control programs, the control data for use in execution of the above-mentioned operation, data regarding the output current-output power characteristics using, as a parameter, the amount or state of charge (SOC) of the battery 40. The RAM 20*c* temporarily stores various data obtained by execution of the aforementioned operations. The input/output port 20*d* inputs the results of detection from the various sensors and sends them to the CPU 20*a*, and furthermore outputs control signals to the various components or elements in accordance with an instruction from the CPU 20*a*.

The fuel cell system of this embodiment employs the bypass 48, the changeover switch 37 and the cutoff switch 41 as described below.

The bypass 48 is formed of connecting lines that directly connect between the input and the output of the DC/DC converter 38. The bypass 48 is provided for supplying power generated by the fuel cell 36 to the inverter 44, while bypassing the DC/DC converter 38, and forms a second electric passage.

The changeover switch 37 is a switch for selectively changing between connection of one of the output lines of the fuel cell 36 to either one of the input lines of the DC/DC converter 38, or to one of the two lines of the bypass 48. Therefore, if the changeover switch 37 has been switched to the input of the DC/DC converter 38, power generated by the fuel cell 36 is supplied to the inverter 44 and the battery 40 via the DC/DC converter 38. If the changeover switch 37 has been switched to the bypass 48, power generated by the fuel cell 36 is supplied to the inverter 44 via the bypass 48 bypassing the DC/DC converter 38. The changeover switch 37 is operated in accordance with a control signal from the control unit 20.

The cutoff switch 41 is a switch for cutting one of the output lines of the battery 40 off from a connecting line between the diode 39 and the inverter 44. When the cutoff switch 41 is on, the battery 40 is electrically connected to the bypass 48 and the DC/DC converter 38. When the cutoff switch 41 is off, the battery 40 is completely electrically disconnected from those components. The cutoff switch 41 is changed between the on-state and the off-states in accordance with a control signal from the control unit 20.

The operation of the fuel cell system of this embodiment will be described in detail with reference to the flowcharts of FIGS. 2 and 3.

Figure 2:
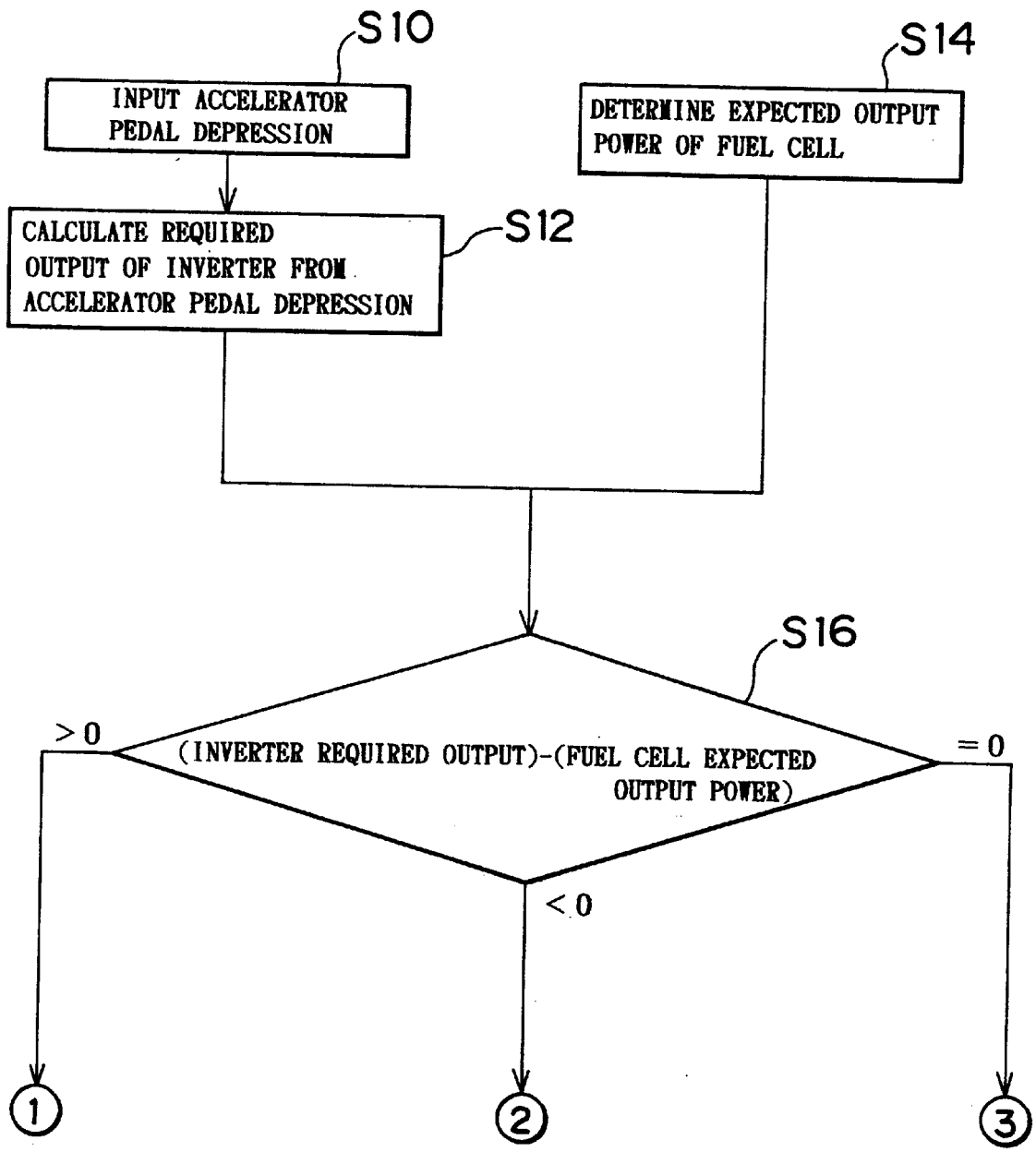
FIG. 2 is a flowchart illustrating an earlier portion of the operation performed by the fuel cell system shown in FIG. 1.
Figure 3:
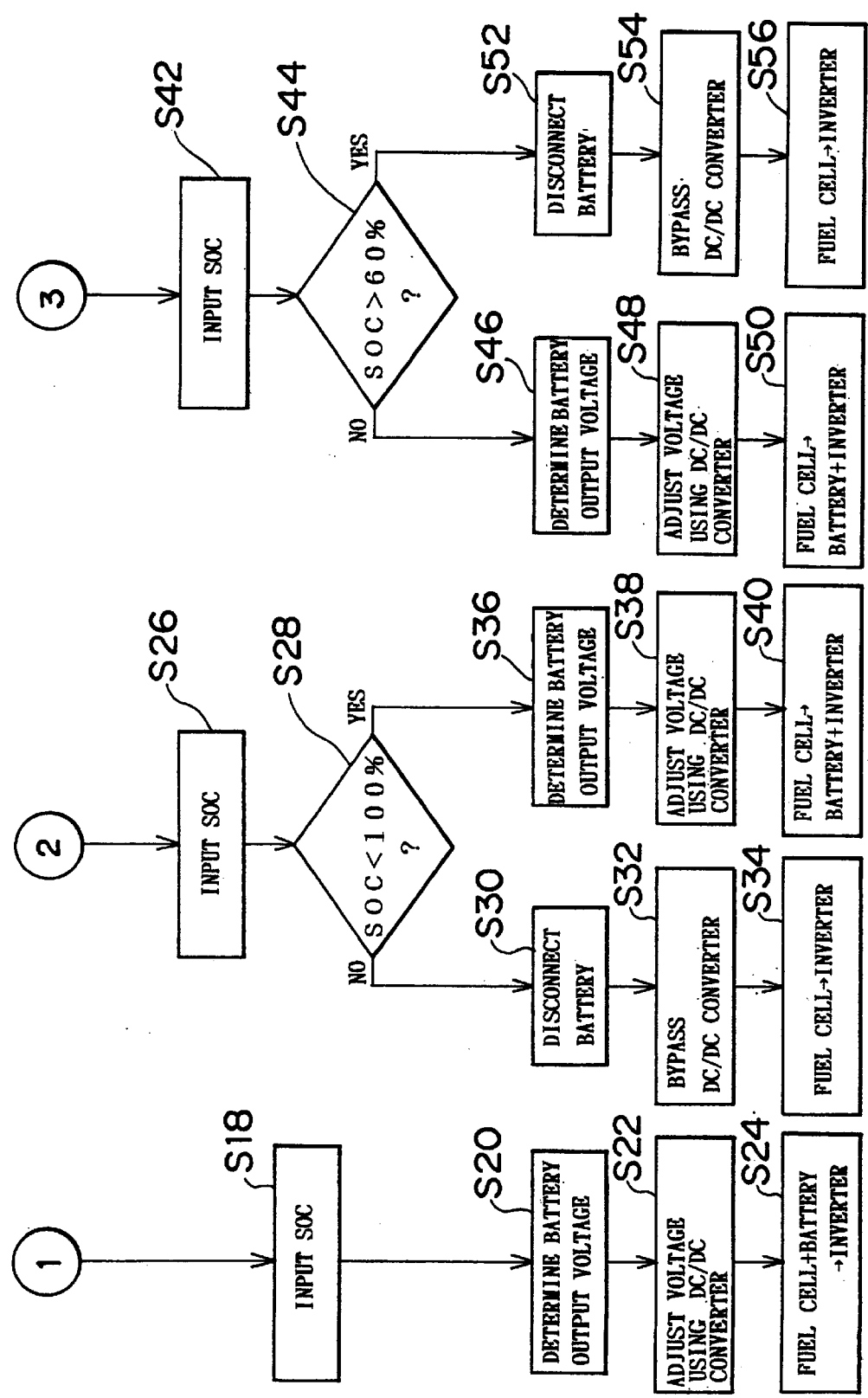
FIG. 3 is a flowchart illustrating a later portion of the operation continuing from the flowchart of FIG. 2.

FIG. 2 is a flowchart illustrating an initial portion of the operation performed by the fuel cell system shown in FIG. 1. FIG. 3 is a flowchart illustrating a later portion of the operation continuing from the flowchart of FIG. 2. In an initial state, the changeover switch 37 is connected to the input of the DC/DC converter 38, and the cutoff switch 41 is in the on-state.

In step S10 in FIG. 2, the control unit 20 inputs an accelerator pedal depression detected by the accelerator pedal position sensor 22. Based on the detected accelerator pedal depression, the control unit 20 is able to detect a driver's intention related to how much power is to be supplied to the motor 46 via the inverter 44 to drive the electric vehicle. In step S12, the control unit 20 calculates a power to be supplied via the inverter 44 (required output of the inverter 44) on the basis of the detected accelerator pedal depression.

Meanwhile, in step S14, the control unit 20 determines a power to be generated by the fuel cell 36, that is, an expected output power. For example, if the fuel cell 36 is desired to be operated at a desired operating point, the control unit 20 calculates the power expected to be generated by the fuel cell 36 if the fuel cell 36 is operated at that operating point, and determines the calculated power as an expected output power.

The control unit 20 may execute the processing of steps S10 and S12 and the processing of step S14 substantially simultaneously, or serially. That is, the control unit 20 may also start one of the processings after completing the other processing.

Subsequently in step S16, the control unit 20 subtracts the expected output power of the fuel cell 36 determined in step S14 from the required output of the inverter 44 calculated in step S12 to determine a difference therebetween. If the difference is greater than zero, the operation proceeds to step S18 in FIG. 3. If the difference is less than zero, the operation proceeds to step S26 in FIG. 3. If the difference is zero, the operation proceeds to step S42 in FIG. 3. The difference being greater than zero indicates that the required output of the inverter 44 cannot be provided solely by the output power of the fuel cell 36. The difference being less than zero indicates that the output power of the fuel cell 36 provides a surplus power after providing the required output for the inverter 44. The difference being equal to zero indicates that the output power of the fuel cell 36 provides the exact amount of the required output of the inverter 44 without a surplus nor a shortage.

Steps S1–S24 in FIG. 3 will be described. If it is determined in step S16 that the difference between the required output of the inverter 44 and the expected output power of the fuel cell 36 is greater than zero, the control unit 20 inputs, in step S18, an amount or state of charge (SOC) of the battery 40 detected by the SOC sensor 42.

Subsequently in step S20, the control unit 20 reads from the ROM 20*b* in the control unit 20 an output current-output voltage characteristic of the battery 40 corresponding to the SOC inputted in step S18.

Figure 4:
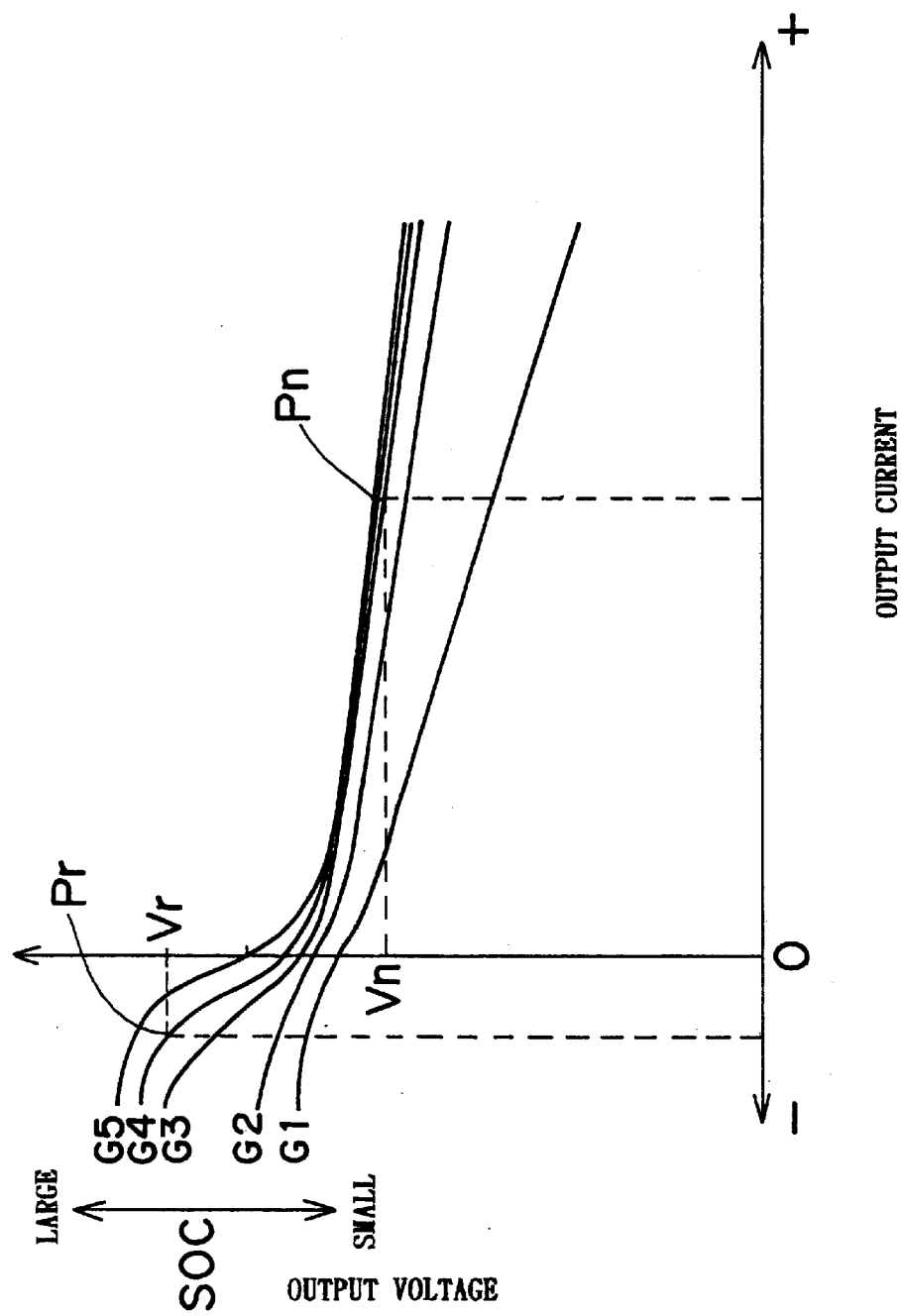
FIG. 4 is a graph indicating an example of the output current-output voltage characteristic map of the battery 40 shown in FIG. 1, wherein SOC is used as a parameter.
Figure 5:
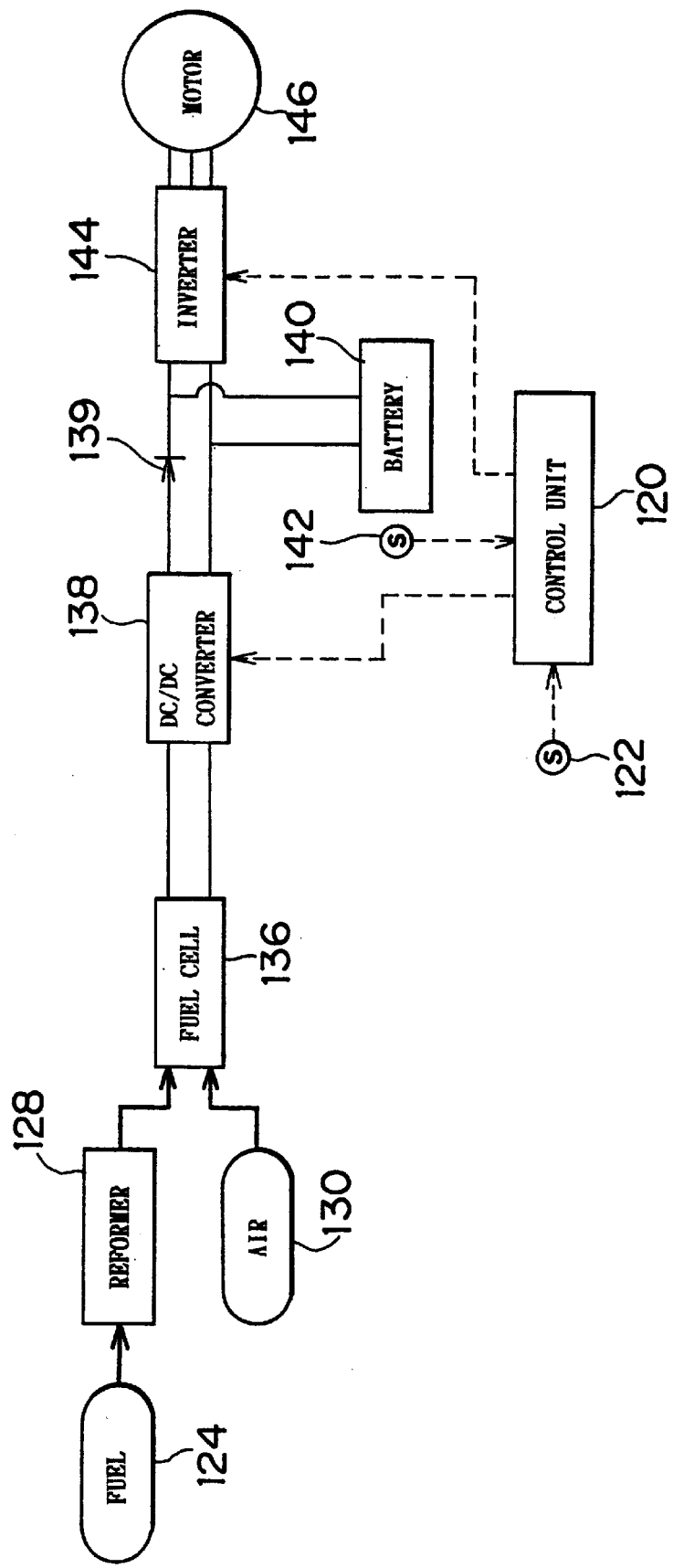
FIG. 5 is an illustration of the construction of a related-art fuel cell system.

As stated above, data regarding output current-output voltage characteristics of the battery 40 using SOC as a parameter as indicated in FIG. 4 are pre-stored in the ROM 20*b* in the control unit 20.

FIG. 4 is a graph indicating an example of the output current-output voltage characteristic map of the battery 40 shown in FIG. 1 wherein SOC is used as a parameter. In the graph of FIG. 4, the vertical axis indicates the output voltage of the battery 40 and the horizontal axis indicates the output current of the battery 40.

As indicated in FIG. 4, the output current-output voltage characteristic of the battery 40 varies depending on SOC. That is, if SOC is determined, then a single output current-output voltage characteristic curve is determined. FIG. 4 shows output current-output voltage characteristic curves G1, G2, G3, G4 and G5 in increasing order of SOC. Thus, various output current-output voltage characteristics corresponding to different SOC values are stored in the ROM 20*b*.

The control unit 20 reads an output current-output voltage characteristic corresponding to the input SOC from the plural output current-output voltage characteristics stored in the ROM 20*b*. Based on the output current-output voltage characteristic thus read, the control unit 20 determines, in step S20, an output voltage required for the battery 40 from the difference between the required output of the inverter 44 and the expected output power of the fuel cell 36 determined in step S16.

More specifically, if the characteristic curve G3 indicated in FIG. 4, as for example, is read out as an output current-output voltage characteristic corresponding to the detected SOC, the control unit 20 calculates a point on the read characteristic curve G3 at which the multiplication product of the output current and the output voltage (that is, the output power of the battery 40) becomes substantially equal to the difference between the required output of the inverter 44 and the expected output power of the fuel cell 36. If the point is, for example, Pn in FIG. 4, the output voltage Vn of the battery 40 at the point Pn is determined as an output voltage required for the battery 40.

Subsequently in step S22, the control unit 20 controls the DC/DC converter 38 so that the output voltage of the DC/DC converter 38 becomes equal to the output voltage determined in step S20. At this moment, the changeover switch 37 is connected to the input of the DC/DC converter 38, and the cutoff switch 41 is in the on-state, as initial states as mentioned above.

Therefore, since the output voltage of the DC/DC converter 38 is applied to the battery 40 and the inverter 44, the output voltage of the battery 40 can be brought to the output voltage determined in step S20 by adjusting the output voltage of the DC/DC converter 38 as described above. As a result, the battery 40 is caused to output a power corresponding to the difference between the required output of the inverter 44 and the expected output power of the fuel cell 36 determined in step S16.

In step S24, the control unit 20 controls the inverter 44 so that the power corresponding to the required output of the inverter 44 calculated in step S12 is supplied to the motor 46 via the inverter 44 and therefore consumed by the motor 46. As a result, the power outputted from the battery 40 is supplied to the inverter 44, and a supplemental amount of power for the required power (that is, the difference between the required output of the inverter 44 and the output power of the battery 40) is extracted from the fuel cell 36, and is supplied to the inverter 44.

That is, the control unit 20 controls the DC/DC converter 38 and the inverter 44 as described above, so that the power equal to the expected output power determined in step S14 is extracted from the fuel cell 36 and the power from the fuel cell 36 is supplied to the inverter 44 together with the power from the battery 40.

Steps S26–S40 in FIG. 3 will next be described. If it is determined in step S16 that the difference between the required output of the inverter 44 and the expected output power of the fuel cell 36 is less than zero, the control unit 20 inputs, in step S26, an amount or state of charge (SOC) of the battery 40 detected by the SOC sensor 42, as in the case where the difference is greater than zero.

Subsequently in step S28, the control unit 20 determines whether the input SOC is less than 100%. If the SOC is 100%, the control unit 20 goes to step S30 taking it into consideration that the battery 40 cannot store any more power. If the SOC is less than 100%, the control unit 20 goes to step S36 taking it into consideration that the battery 40 still has a capacity for storing power.

If the SOC is 100% (NO in step S28), the control unit 20 controls the cutoff switch 41 to turn the cutoff switch 41 off in step S30, so that the battery 40 is electrically disconnected from the inverter 44, the bypass 48, the DC/DC converter 38 and the like. Therefore, no power is outputted from the battery 40, and no power is stored in the battery 40.

Subsequently in step S32, the control unit 20 controls the changeover switch 37 to switch the connection thereof to the bypass 48. As a result, the output of the fuel cell 36 is connected to the input of the inverter 44 by the bypass 48, bypassing the DC/DC converter 38.

Subsequently in step S34, the control unit 20 controls the inverter 44 so that the power corresponding to the required output of the inverter 44 calculated in step S12 is supplied via the inverter 44 to the motor 46 and therefore consumed by the motor 46. As a result, the power corresponding to the required output of the inverter 44 is extracted from the fuel cell 36, and is supplied to the inverter 44 via the bypass 48, without being conducted via the DC/DC converter 38 and without being stored into the battery 40. Therefore, the entire power from the fuel cell 36 is consumed by the motor 46.

Therefore, since the DC/DC converter 38, which causes a considerable power loss, is bypassed in the aforementioned case, substantially the entire power extracted from the fuel cell 36 can be supplied to the inverter 44 without any substantial power loss.

Furthermore, since the power corresponding or equivalent to the required output of the inverter 44 is extracted from the fuel cell 36, the power extracted from the fuel cell 36 is less than the expected output power determined in step S14 in this case. This is because the difference between the required output of the inverter 44 and the expected output power of the fuel cell 36 is less than zero in this case.

If it is determined in step S28 that the SOC is less than 100% (YES in step S28), the control unit 20 reads, in step S36, an output current-output voltage characteristic corresponding to the SOC inputted in step S26 from the ROM 20*b* provided in the control unit 20. Furthermore in step S36, based on the output current-output voltage characteristic read from the ROM 20*b*, the control unit 20 determines an output voltage required for the battery 40 from the difference between the required output of the inverter 44 and the expected output power of the fuel cell 36 determined in step S16.

Step S36 is executed as in step S20. That is, if the characteristic curve G3 indicated in FIG. 4, for example, is read out as an output current-output voltage characteristic corresponding to the detected SOC, the control unit 20 calculates a point on the read characteristic curve G3 at which the multiplication product of the output current and the output voltage (that is, the output power of the battery 40) becomes substantially equal to the difference between the required output of the inverter 44 and the expected output power of the fuel cell 36. Since the difference between the required output of the inverter 44 and the output power of the fuel cell 36 is less than zero (i.e., a negative value) in this case, the control unit 20 calculates a point at which the product of the output current and the output voltage (i.e., the output power of the battery 40) is a negative value. The output power of the battery 40 being negative means that the power is stored into the battery 40. Since the output voltage of the battery 40 does not become negative as can be seen from FIG. 4, the control unit 20 calculates a point at which the output current is negative.

If the point is, for example, Pr in FIG. 4, the output voltage Vr of the battery 40 at the point Pr is determined as an output voltage required for the battery 40.

Subsequently in step S38, the control unit 20 executes substantially the same processing as in step S22. At this moment, the changeover switch 37 and the cutoff switch 41 are in the initial states, that is, the changeover switch 37 is connected to the input of the DC/DC converter 38 and the cutoff switch 41 is in the on-state, as mentioned above.

That is, in step S38, the control unit 20 adjusts the output voltage of the DC/DC converter 38 so that the output voltage of the battery 40 becomes equal to the output voltage determined in step S36. Therefore, a power is stored into the battery 40. More specifically, of the power extracted from the fuel cell 36, an amount of power corresponding to the absolute value of the difference between the required output of the inverter 44 and the expected output power of the fuel cell 36 is stored into the battery 40.

Subsequently in step S40, the control unit 20 controls the inverter 44 so that the power corresponding to the required output of the inverter 44 calculated in step S12 is supplied to the motor 46 via the inverter 44 and therefore consumed by the motor 46. As a result, of the power extracted from the fuel cell 36, an amount of power corresponding to the required output of the inverter 44 (that is, the amount of power that is not stored into the battery 40) is supplied to the inverter 44 and consumed by the motor 46.

That is, the control unit 20 controls the DC/DC converter 38 and the inverter 44 as described above, so that the power equal to the expected output power determined in step S14 is extracted from the fuel cell 36 and a portion of the power is stored into the battery 40.

Steps S42–S56 in FIG. 3 will be described. If it is determined in step S16 that the difference between the required output of the inverter 44 and the expected output power of the fuel cell 36 is zero, the control unit 20 inputs, in step S42, an amount or state of charge (SOC) of the battery 40 detected by the SOC sensor 42, as in steps S18 and S26.

Subsequently in step S44, the control unit 20 determines whether the input SOC is greater than 60%. If it is determined that the SOC is not greater than 60%, it is considered that the battery 40 is not sufficiently charged, and needs to be further charged, and therefore the operation proceeds to step S46. If the SOC is greater than 60%, it is considered that the battery 40 stores a sufficiently large amount of power and does not need to be further charged, and therefore the operation proceeds to step S52.

If the SOC is equal to or lower than 60% (NO in step S44), the control unit 20 reads, in step S46, an output current-output voltage characteristic corresponding to the SOC inputted in step S42 from the ROM 20*b* provided in the control unit 20. Furthermore in step S46, based on the output current-output voltage characteristic read from the ROM 20*b*, the control unit 20 determines an output voltage required for the battery 40.

Step 46 is executed in substantially the same manner as in steps S20 and S36. That is, if the characteristic curve G3 indicated in FIG. 4, for example, is read out as an output current-output voltage characteristic corresponding to the detected SOC, the control unit 20 sets a desired point on the read characteristic curve G3 at which the multiplication product of the output current and the output voltage (that is, the output power of the battery 40) is a negative value (that is, a desired point at which the output current of the battery 40 is negative), in order to store power into the battery 40. The control unit 20 determines the output voltage of the battery 40 at that point as an output voltage required for the battery 40.

Subsequently in step S48, the control unit 20 adjusts the voltage using the DC/DC converter 38 as in steps S22 and S38. At this moment, the changeover switch 37 and the cutoff switch 41 are in the initial states, that is, the changeover switch 37 is connected to the DC/DC converter 38 and the cutoff switch 41 is in the on-state, as mentioned above.

That is, the output voltage of the DC/DC converter 38 is adjusted so that the output voltage of the battery 40 becomes equal to the output voltage determined in step S46. Thus, more power is stored into the battery 40. More specifically, of the power extracted from the fuel cell 36, an amount of power corresponding to the point set in step S46 (that is, an amount of power corresponding to the absolute value of the multiplication product of the output current and the output voltage at that point) is stored into the battery 40.

In step S50, the control unit 20 controls the inverter 44 so that the power corresponding to the required output of the inverter 44 calculated in step S12 is supplied to the motor 46 via the inverter 44 and therefore consumed by the motor 46. As a result, of the power extracted from the fuel cell 36, an amount of power corresponding to the required output of the inverter 44 is supplied to the inverter 44 and consumed by the motor 46.

Thus the control unit 20 controls the DC/DC converter 38 and the inverter 44 as described above, so that a portion of the power extracted from the fuel cell 36 is stored into the battery 40.

In this case, power is extracted from the fuel cell 36 not only for the power corresponding to the required output of the inverter 44 but also for the power that is to be stored into the battery 40. Therefore, the power actually extracted from the fuel cell 36 becomes greater than the expected output power determined in step S14.

If it is determined in step S44 that the SOC is greater than 60% (YES in step S44), the control unit 20 controls the cutoff switch 41 in step S52 to turn off the cutoff switch 41, so that the battery 40 is electrically disconnected from the inverter 44, the bypass 48, the DC/DC converter 38 and the like, as in step S30. As a result, no power is outputted from the battery 40, and no power is stored into the battery 40.

Subsequently in step S54, the control unit 20 controls the changeover switch 37 to switch the connection of the changeover switch 37 to the bypass 48, as in step S38. As a result, the output of the fuel cell 36 is connected to the input of the inverter 44 via the bypass 48, bypassing the DC/DC converter 38.

Subsequently in step S56, the control unit 20 controls the inverter 44 so that the power corresponding to the required output of the inverter 44 calculated in step S12 is supplied to the motor 46 via the inverter 44 and therefore consumed by the motor 46. As a result, the power corresponding to the required output of the inverter 44 is extracted from the fuel cell 36 is supplied to the inverter 44 and consumed by the motor 46, without being conducted through the DC/DC converter 38 nor being stored into the battery 40.

Since the DC/DC converter 38, which causes a considerable power loss, is bypassed, substantially the entire power extracted from the fuel cell 36 can be supplied to the inverter 44 without any substantial power loss.

As is apparent from the foregoing description, the processing in each of steps S34 and S56 in the embodiment supplies the power generated by the fuel cell 36 to the inverter 44 while bypassing the DC/DC converter 38, which causes a power loss, so that substantially no power loss occurs in the conducting passage. Furthermore, in each of the steps S34 and S56, it is unnecessary to store power into the battery 40 and to output power from the battery 40. Therefore, the processing of the steps S34 and S56 is not affected by the electrical disconnection of the battery 40 from the inverter 44, the bypass 48, the DC/DC converter 38 and the like which is accomplished by operating the cutoff switch 41 in steps S30 and S52. Furthermore, the disconnection of the battery 40 in steps S30 and S52 eliminates the need to set the output voltage of the battery 40 to a desired value, so that the DC/DC converter 38 becomes unnecessary. Therefore, bypassing the DC/DC converter 38 does not cause any problem.

If load fluctuation is small, for example, during high-speed travel, in the electric vehicle equipped with the fuel cell system of this embodiment, the frequency of the switching of the changeover switch 37 and the cutoff switch 41 decreases, and the power conduction via the bypass 48 with the battery 40 disconnected becomes more likely to be selected for a greater proportion of the entire duration. The embodiment thus becomes more effective in such a case. Since in typical fuel cells the efficiency decreases at the time of high output, power conduction via the bypass 48 with the battery 40 disconnected becomes very effective if a high output of the fuel cell is required, for example, during high-speed travel or the like.

It is to be understood that the invention is not limited to the disclosed embodiment or constructions. To the contrary, the invention is intended to cover various modifications and equivalent arrangements included within the spirit and scope of the invention.

Although in the foregoing embodiment, the changeover switch 37 is a switch for selectively changing the connection of the fuel cell 36 between the connection to the input DC/DC converter 38 and the connection to the bypass 48, the changeover switch 37 may also be a switch for selectively changing the connection of the input of the inverter 44 between the connection to the output of the DC/DC converter 38 and the connection to the bypass 48. It is also possible to employ a changeover switch for changing between the disconnection of the bypass 48 and the connection of the bypass 48.

Although in the foregoing embodiment, methanol and water are supplied as the fuel 24 to the reformer 28, the fuel usable in the invention is not limited to those materials. For example, methanol may be replaced by methane, ethanol, natural gas, gasoline, light oil, or the like. If hydrogen is used as a fuel 24, the reformer 28 becomes unnecessary.

Furthermore, the fuel cell 36 is not limited to a polymer electrolyte fuel cell, but may also be other type of fuel cell, for example, a phosphoric acid fuel cell, a solid electrolyte fuel cell, and the like.

What is claimed is:

1. A fuel cell system comprising:
   a fuel cell adapted to be supplied with a fuel;
   a secondary battery connected for storing power generated by the fuel cell and connected for supplying a power stored therein to a load;
   a voltage adjuster capable of adjusting a voltage of the power generated by the fuel cell;
   a first electric passage that supplies the power generated by the fuel cell to the load via the voltage adjuster;
   a second electric passage that supplies the power generated by the fuel cell to the load without conduction via the voltage adjuster; and
   a first switch that selectively switches a power connection path from the fuel cell to the load between the first electric passage and the second electric passage.

2. The fuel cell system according to claim 1, wherein the voltage adjuster is a DC/DC converter.

3. The fuel cell system according to claim 1, further comprising:
   a second switch positioned to selectively disconnect an electric connection between the secondary battery and the voltage adjuster and an electric connection between the secondary battery and the load; and
   a controller connected to the first and second switches to control the second switch to disconnect the electrical connection when at least one of a condition for elimination of a need to store a power into the secondary battery and a condition for elimination of a need to output a power from the secondary battery is established, and to control the first switch to select the first electric passage when the second switch disconnects the electric connection.

4. The fuel cell system according to claim 3, wherein the voltage adjuster is a DC/DC converter.

5. The fuel cell system according to claim 3, wherein a condition for the second switch to discontinue the electric connection between the secondary battery and the voltage adjuster and the electric connection between the secondary battery and the load is one of a condition that an amount of charge of the secondary battery is substantially 100%, and a condition that a difference between a required power of the load and an expected output power of the fuel cell is substantially zero and that the amount of charge of the secondary battery is greater than a predetermined reference amount.

6. The fuel cell system according to claim 5, wherein the voltage adjuster is a DC/DC converter.

7. An electric vehicle including a fuel cell system, comprising:
   a fuel cell adapted to be supplied with a fuel;
   a secondary battery connected for storing power generated by the fuel cell and connected for supplying a power stored therein to a load;
   a voltage adjuster capable of adjusting a voltage of the power generated by the fuel cell;
   a first electric passage that supplies the power generated by the fuel cell to the load via the voltage adjuster;
   a second electric passage that supplies the power generated by the fuel cell to the load without conduction via the voltage adjuster; and
   a first switch that selectively switches a power connection path from the fuel cell to the load between the first electric passage and the second electric passage.

8. The electric vehicle according to claim 7, wherein the voltage adjuster is a DC/DC converter.

9. The electric vehicle according to claim 7, further comprising:
   a second switch positioned to selectively disconnect an electric connection between the secondary battery and the voltage adjuster and an electric connection between the secondary battery and the load; and
   a controller connected to the first and second switches to control the second switch to disconnect the electrical connection when at least one of a condition for elimination of a need to store a power into the secondary battery and a condition for elimination of a need to output a power from the secondary battery is established, and to control the first switch to select the first electric passage when the second switch disconnects the electric connection.

10. The electric vehicle according to claim 9, wherein the voltage adjuster is a DC/DC converter.

11. The electric vehicle according to claim 9, wherein a condition for the second switch to discontinue the electric connection between the secondary battery and the voltage adjuster and the electric connection between the secondary battery and the load is one of a condition that an amount of charge of the secondary battery is substantially 100%, and a condition that a difference between a required power of the load and an expected output power of the fuel cell is substantially zero and that the amount of charge of the secondary battery is greater than a predetermined reference amount.

12. The electric vehicle according to claim 11, wherein the voltage adjuster is a DC/DC converter.

13. A fuel cell system comprising:

a fuel cell adapted to be supplied with a fuel;

secondary battery means for storing power generated by the fuel cell and for supplying a power stored therein to a load;

voltage adjuster means for adjusting a voltage of the power generated by the fuel cell;

first electric passage means for supplying the power generated by the fuel cell to the load via the voltage adjuster means;

second electric passage means for supplying the power generated by the fuel cell to the load without conduction via the voltage adjuster means; and first switch means for selectively switching a power connection path from the fuel cell to the load between the first electric passage means and the second electric passage means.

14. The fuel cell system according to claim 13, wherein the voltage adjuster means is a DC/DC converter.

15. The fuel cell system according to claim 13, further comprising:

second switch means for selectively disconnecting an electric connection between the secondary battery means and the voltage adjuster means and an electric connection between the secondary battery means and the load; and controller means for controlling the second switch means to disconnect the electrical connection when at least one of a condition for elimination of a need to store a power into the secondary battery means and a condition for elimination of a need to output a power from the secondary battery means is established, and for controlling the first switch means to select the first electric passage means when the second switch means disconnects the electric connection.

16. The fuel cell system according to claim 15, wherein the voltage adjuster means is a DC/DC converter.

17. The fuel cell system according to claim 15, wherein a condition for the second switch means to discontinue the electric connection between the secondary battery means and the voltage adjuster means and the electric connection between the secondary battery means and the load is one of a condition that an amount of charge of the secondary battery means is substantially 100%, and a condition that a difference between a required power of the load and an expected output power of the fuel cell is substantially zero and that the amount of charge of the secondary battery means is greater than a predetermined reference amount.

18. The fuel cell system according to claim 17, wherein the voltage adjuster means is a DC/DC converter.

\* \* \* \* \*